United States Patent
Günther (10) Patent No.: US 11,205,816 B2
(45) Date of Patent: Dec. 21, 2021

(54) BATTERY HOUSING FOR A VEHICLE DRIVEN BY ELECTRIC MOTOR

(71) Applicant: Kirchhoff Automotive Deutschland GmbH, Attendorn (DE)

(72) Inventor: Alexander Günther, Olpe (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 136 days.

(21) Appl. No.: 16/320,060

(22) PCT Filed: Jul. 31, 2017

(86) PCT No.: PCT/EP2017/069275
§ 371 (c)(1),
(2) Date: Jan. 23, 2019

(87) PCT Pub. No.: WO2018/029020
PCT Pub. Date: Feb. 15, 2018

(65) Prior Publication Data
US 2019/0229311 A1 Jul. 25, 2019

(30) Foreign Application Priority Data
Aug. 10, 2016 (DE) .................... 10 2016 114 839.3

(51) Int. Cl.
*H01M 50/20* (2021.01)
(52) U.S. Cl.
CPC ........ *H01M 50/20* (2021.01); *H01M 2220/20* (2013.01)
(58) Field of Classification Search
CPC .......................... H01M 50/20; H01M 2220/20
See application file for complete search history.

(56) References Cited

U.S. PATENT DOCUMENTS

| 10,424,770 B2 | 9/2019 | Günther |
| 2010/0136402 A1 | 6/2010 | Hermann et al. |
| (Continued) | | |
| 2011/0143179 A1 | 6/2011 | Nakamori |
| 2012/0028111 A1* | 2/2012 | Gunduz ............... H01M 50/35 429/175 |

FOREIGN PATENT DOCUMENTS

| CN | 102092267 A | 6/2011 |
| DE | 4110552 A1 | 10/1992 |
| (Continued) | | |

OTHER PUBLICATIONS

EPO machine generated English translation of DE-10-2016114512-A1 (Year: 2018).*

(Continued)

*Primary Examiner* — Christopher P Domone
*Assistant Examiner* — Kimberly Wyluda
(74) *Attorney, Agent, or Firm* — Polson Intellectual Property Law, PC; Margaret Polson; Christopher Sylvain (57) ABSTRACT

A battery housing for a vehicle driven by electric motor has a first housing part and a second housing part connected to the first housing part. A battery chamber is enclosed by the housing parts. The housing parts have a connecting flange. The connecting flange of at least one of the two housing parts has at least one supporting projection, which extends in the direction of the connecting flange of the other housing part as support for the connecting flange of the other housing part. The two connecting flanges of the housing parts are connected to one another at a distance from the supporting projection and are put under tension. A plurality of supporting projections spaced a distance apart from one another in the circumferential direction of the connecting flange is arranged on the flanges.

14 Claims, 5 Drawing Sheets

(56) References Cited

U.S. PATENT DOCUMENTS

| | | | |
|---|---|---|---|
| 2012/0312614 A1* | 12/2012 | Fujiwara | H01M 50/20 180/68.5 |
| 2015/0375623 A1* | 12/2015 | Galamb | B60L 3/003 180/65.31 |
| 2019/0036092 A1 | 1/2019 | Günther | |
| 2019/0252741 A1 | 8/2019 | Günther | |
| 2019/0259994 A1 | 8/2019 | Günther | |
| 2019/0273231 A1 | 9/2019 | Günther | |
| 2019/0381899 A1 | 12/2019 | Günther | |

FOREIGN PATENT DOCUMENTS

| | | | |
|---|---|---|---|
| DE | 102016114512 A1 * | 2/2018 | H01M 2/1072 |
| EP | 2437329 A1 | 4/2012 | |
| EP | 2565958 A1 | 3/2013 | |
| EP | 2741343 A1 | 6/2014 | |
| WO | 9726782 A2 | 7/1997 | |

OTHER PUBLICATIONS

EPO machine generated English translation of DE 4110552 A1 (Year: 1992).*

International Search Report dated Feb. 15, 2018 in parent International application PCT/EP2017/069275.

International Preliminary Report on Patentability dated Aug. 8, 2018 in parent International application PCT/EP2017/069275.

Office Action dated Jan. 8, 2021 in related Chinese application 201780046728.X (A concise explanation of relevance is provided by the X/Y indications in the table on p. 9 of the Office Action and the attached letter of Chinese counsel dated Feb. 1, 2021, as the English translation of the Office Action is not currently available in Global Dossier—see MPEP 609.04(a)(III)].

English translation of Office Action dated Jan. 8, 2021 in related Chinese application 201780046728.X retrieved from Global Dossier (untranslated Office Action and references previously cited in the IDS filed on Feb. 5, 2021).

* cited by examiner

BATTERY HOUSING FOR A VEHICLE DRIVEN BY ELECTRIC MOTOR

BACKGROUND

The present disclosure relates to a battery housing for a vehicle driven by electric motor, having a first housing part and a second housing part electrically connected to the first housing part to accommodate one or more battery modules, said housing parts encompassing a battery chamber and said housing parts having a connecting flange, wherein the connecting flange of at least one of the two housing parts has at least one supporting projection protruding in the direction of the connecting flange of the other housing part as support for the connecting flange of the other housing part, and the two connecting flanges of the housing parts are connected to one another at a distance from the supporting projection under prestress.

Battery modules are used as power storage devices in vehicles driven by electric motor such as, for example, passenger vehicles, trucks, forklifts, industrial trucks and the like. Such battery modules are typically assembled from a plurality of individual batteries. These batteries are so-called high voltage batteries. Certain requirements are made of the accommodation of such battery modules which are required for operation of such a vehicle. It is essential for the battery module(s) to be protected from external influences in their battery housing. Furthermore, an accommodation of the battery module(s) in a battery housing sealed to prevent moisture from penetrating is necessary to prevent condensate from forming inside the battery housing. Moisture penetrating into the battery chamber of the battery housing can result in a short circuit and can therefore cause fire in the battery module.

For the purpose of accommodating the battery modules, which typically consist of a plurality of battery cells, in such a battery housing so that they are protected from moisture, the housing parts are connected to one another in such a way that they are sealed. US 2010/136402 A1 proposes that a circumferential gasket be inserted between the two connecting flanges in production of a battery module and that the connecting flanges should be put under stress with respect to one another using a plurality of screws. The screws provided for connecting the connecting flanges pass through the connecting flanges at a slight distance on the outside with respect to the gasket.

Meanwhile, it is necessary for the battery modules contained in a battery housing to be replaced over time, individually or as a whole. This is a complex procedure because typically a large number of screw fasteners are used to hold the two housing parts together. It is therefore necessary to loosen these screws, and after one or more battery modules have been replaced, to install them again per specification for prestressing the two housing parts. In prestressing the two housing parts, care must be taken to ensure that all the tension bolts are tightened with the same force. Unequal tightening of the connecting flanges over the circumference of the housing parts may result in leaks. Because of the large number of fasteners used for connecting the two housing parts of a battery housing in accordance with specifications, this connecting technology is regarded as cost-intensive. Depending on the size of a battery housing, 50 or more such fasteners are required. To achieve the desired moisture exclusion of the battery chamber enclosed by the housing parts with respect to its exterior, these disadvantages have so far been simply accepted for lack of alternatives.

Such battery housings must also meet the requirements with regard to electromagnetic compatibility (EMC). This is true in particular of battery housings that contain not only battery modules but also the components for electric energy management and the power supply. Shielding both from the inside to the outside as well as from the outside to the inside must therefore meet the requirements for EMC. The latter is required in order to prevent access from the outside to accessory devices contained in the battery housing or any external influence. Openings in the metallic battery housing such as holes or slots have a negative effect on the electromagnetic shielding. To meet these requirements, it is necessary for all housing parts to be electrically interconnected.

To provide an airtight seal between the two housing parts and an electrical connection of the same, WO 97/26782 A2 uses a coated conductive sealing element. Instead of such seals, which are relatively cost-intensive, spring plates, spring contacts or spring strips arranged between the housing parts are also used to meet EMC requirements in this regard. With such a design, it is self-evident that a seal must be provided between the housing parts for the airtight closure.

Furthermore, EP 2 741 343 A1 discloses a battery housing to accommodate battery modules, wherein the housing pan and the housing cover are connected by means of supporting projection and prestress.

In addition, US 2011 0 143 179 A1 discloses a traditional battery housing for accommodating a plurality of battery modules, in which the housing chamber and the housing cover are connected by means of screw connections via flanges.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Against this background, an aspect of the present disclosure is therefore to propose a battery housing for a vehicle driven by electric motor and having a first and a second housing part, these housing parts being interconnectable in a manner that conforms to EMC requirements basically without requiring any additional elements to do so.

This is achieved according to the present disclosure by a battery housing of the type defined in the introduction in which a plurality of supporting projections spaced a distance apart from one another are arranged in the circumferential direction of the connecting flanges.

One particular feature in the connection of these housing parts is that the connecting flange of at least one of the two housing parts carries one or more supporting projections. The at least one supporting projection protrudes from the surface of the connecting flange carrying it in the direction of the connecting flange of the other housing part, and constitutes a support for the connecting flange of the other housing part. This housing part is thus supported directly on the closure(s), for example, the peaks of the supporting projections. The fastening means for connecting the two connecting flanges are arranged at a distance from the at least one supporting projection. Depending on the type of fastener used, they are arranged a distance apart from the at least one supporting projection in the direction of or away from the battery chamber. In one embodiment, in which the supporting projection is provided by an angle bend in the outer closure of a connecting flange, the fastening means are spaced a distance apart in the direction of the battery chamber. The spacing of the fastening means for connecting the two connecting flanges from the at least one supporting projection serves to form a tension leg which is spaced a distance apart due to the support of the supporting projection on the connecting flange of the other housing part. The tension leg is put under a prestress by the fastening means through the assembly process of the two housing parts with one another, in that its distance from the surface of the other connecting flange is reduced. This ensures that the supporting projections are in contact with the connecting flange of the other housing part with an increased prestress.

A connecting flange of such a housing part may then be said to only have a single supporting projection if it is circumferential. In other cases, a plurality of supporting projections are provided, which then follow the closure of the connecting flange at the edge and are arranged at a distance from one another.

Due to the design of the supporting projection or supporting projections, the contact surface between the two connecting flanges is reduced. However, this results in a concentration of force on the peak of the supporting projection and/or the supporting projections such that these are in contact with the connecting flange of the other housing part under a correspondingly high contact pressure. This ensures the proper electrical contact without requiring any additional elements.

Screw fasteners may be used as the fastening means for connecting the connecting flanges of the two housing parts. In another embodiment, the connecting flanges are glued together, such that the tension leg is put under a certain prestress until the adhesive glue that is used sets. In such an embodiment, if the adhesive bonding is provided circumferentially, this also provides the usual desired sealing at the same time.

The supporting the connecting flanges of the two housing parts on one another to form a tension leg—these housing parts being prestressed with one another by the fastening means in assembly of the two housing parts—may be used to substantially simplify assembly and dismantling of one housing part from the other housing part. Such a tension leg may provide the required tension force and/or locking force for a clip lock so that, with such an embodiment, the two housing parts can be joined to one another by a plurality of clip locks. This is achieved since each connecting flange carries at least one first member of a clip lock, which cooperates with a second clip lock member of the other connecting flange, wherein the clip lock members are spaced a distance apart from the at least one supporting projection in the direction of the battery chamber.

With this battery housing, the two housing parts each carry complementary members which are thus cooperating members of a clip lock so that the two housing parts can be clipped together for locking the same. Such a connection can be established rapidly, which is usually possible even without using tools. Furthermore, there is no danger of the plurality of clip locks, with which the two housing parts are joined together, exerting a different prestress on the connecting flanges of the two housing parts that are to be put under tension. The cooperating members are each part of a connecting flange, wherein the connecting flange of one housing part typically has the clip locking members, and the connecting flange of the other housing part has the clip locking trap members. The connecting flanges are typically designed to be circumferential and continuous but they may also be formed by a plurality of connecting flange segments spaced a distance apart from one another.

Due to the at least one supporting projection, the sections of the connecting flanges are spaced a distance apart in the area of their clip locking members so that to establish the clip lock, the two clip locking members are moved toward one another and can in this way be made to engage with one another. The properties of the material and/or the design of the respective connecting flange determines to what extent the flange assumes the function of a tension leg. In this concept, the elasticity of the material of at least one of the two connecting flanges is utilized. The material used for such purposes has a sufficient material elasticity to establish a clip lock of the two housing parts and be able to release it as needed. If both connecting flanges are incorporated into the function of a tension leg, with sections supported on the supporting projection, then both connecting flanges with their sections in this regard are to be regarded as tension legs. If one of the two connecting flanges is more rigid than the other, then the required restoring force for the lock is supplied by the tension leg of the less rigid connecting flange. The width of the tension gap between the tension leg of one connecting flange and the opposite section of the other connecting flange defines the maximum amount of adjustment, with which the cooperating clip lock members can be moved toward one another to establish and release the clip connection. The same is also true for a design of the battery housing in which the two housing parts are connected to one another using other fastening means.

In the case of a clip lock for connecting the two housing parts to one another, this connection may be carried out with clip lock members on the side of the supporting projection(s) opposite the battery chamber, if detachment of the two housing parts from one another is to be provided. A design in which the clip lock members of the two connecting flanges are arranged on the inside with respect to the supporting projections is also possible. A lock is readily possible in such a case.

Depending on the length of the connecting flanges on each side of the housing parts, the connecting flanges may carry a plurality of clip lock members spaced a certain distance apart from one another. One of the two connecting flanges carries at least one clip lock member designed as a bar, while a lock receptacle for receiving such a bar-type clip lock member is provided by the other connecting flange.

In an embodiment that is simple to manufacture, it is provided that the connecting flange of one housing part carries a leg angled in the direction of the connecting flange of the other housing part with at least one clip lock member arranged in the end area of the leg. The clip lock member may be designed in the manner of a hook, wherein the hook element represents the bar of the clip lock. In a first embodiment, the bar can engage behind the connecting flange of the other housing part. In another embodiment, the connecting flange of the other housing part has an angled leg bent in the same direction as the bent leg of the housing part with the bar. Therefore, the outer closure of this other connecting flange is stiffened. In one embodiment where the clip lock member of the connecting flange is a hook-shaped element, this hook-shaped element engages behind the closure of the angled leg of the other connecting flange. The leg of a connecting flange having such a hook-shaped clip lock member need not be continuous over the length of the connecting flange. However, although this is possible, one would usually provide the angled legs carrying these clip lock members only in sections in order to save on material and weight, namely in locations where these clip lock members are needed.

Not only can a clip connection with the support of the two connecting legs to each another as described above be manufactured easily and released and reconnected again for reuse, it also enables integration of a circumferential seal which is prestressed by the prestress induced by the clip lock.

According to one embodiment, a plurality of supporting projections arranged in a row following the outer closure of the connecting flange are provided, with each supporting projection being embodied as a circular or oval sickle-shaped embossing. These supporting protrusions are provided at a distance apart from one another in an arrangement which follows the longitudinal extent of the connecting flange.

Such supporting projections can be produced without any additional elements by embossing the connecting flange of one housing part and/or the other housing part. If the housing part carrying the supporting projections is a shaped steel plate, the supporting projections can be created using the same tool in which the steel plate blank is formed.

According to another embodiment, it is provided that the supporting projections are supplied by straps bent at an angle out of the plane of the respective connecting flange. These may also be radially situated on the outer edge of the connecting flange. It is also possible for these to be arranged at a distance from the outer edge of the connecting flange.

The distance of the supporting projection(s) from the outer closure of the connecting flange is selected as a function of the desired design of the connecting flange connection. This also depends on whether the supporting projections are arranged inside or outside of the gasket inserted into the flange connection. If a housing part without any additional coating is susceptible to corrosion, the supporting projections should be arranged interior to the gasket inserted into the flange connection. In this way, the desired electrical contacting can take place without any additional safety measures on the material used for the housing part(s). Such electrical contacting is necessary to fulfill the EMC requirements. If the materials to be contacted or at least one of them is at risk of corrosion and if the support via the supporting projections is situated outside of the gasket, then the connection site will usually be provided with an anti-corrosion layer after assembling the two housing parts.

The housing parts of the battery housing can be produced from different materials. Steel or even light metal alloys may be recommended materials for this purpose. It is also possible for one housing part to be made of a first material and the second housing part to be made of a second material. The housing parts may also be converted to their respective shapes in different ways, for example, by forming a circuit board, for example, by deep drawing of the same. It is also quite possible to produce one or both housing parts by a die casting method. One of the two housing parts is typically designed in the manner of a pan, while the other housing part is a cover part for closing the pan. Such a pan-type housing part may in turn be assembled from individual elements. For example, it is possible to provide for a circumferential frame to be produced from hollow chamber profiles to which a bottom plate is connected to form a bottom of the housing, for example, by an adhesive bond. In one refinement of such an embodiment of a battery housing, it is provided that both a cover housing part and a bottom housing part are connected to a circumferential frame from opposite sides with a connection according to the concept described above. The connections in this regard may of course have different designs in detail. For example, for a bottom part connected to such a frame, the connection may be formed by clip locks, in which the clip lock members are arranged on the inside with respect to the supporting projections and therefore these locks are not releasable. On the other hand, in the case of a cover part, the clip lock members may be arranged on the outside with respect to the supporting projection in order to permit access to the interior of the battery box as needed.

Such a battery housing having two housing parts may be connected to a battery housing frame. This frame encloses the battery housing on its outer sides and serves to stabilize it and to prevent damage to the battery housing and/or to the battery modules accommodated therein, at least to a certain extent. This battery housing frame is preferably designed to be energy absorbing and typically formed from easily deformable components, such as extruded aluminum profiles, which are also used for so-called crash boxes. Connections to such a battery housing frame can be established in the same way the two housing parts are connected to one another, such as by the clip lock describe above. To this end, the connecting flange which has the clip bar trap may also have a clip lock member, while the frame has the complementary clip lock element to this member. In this way, two clip connections are provided in a backpack or piggyback arrangement.

The connecting flanges of the housing parts are provided so that they protrude in the radial direction away from the housing parts in numerous embodiments. If one housing part is a flat cover part without any other characteristics, then a circumferential edge area of a cover part designed in this way will form the connecting flange. An embodiment of the connecting flanges extending parallel to the side part segments of the two housing parts is also possible. In such an embodiment, the side walls of one housing part are arranged so that they overlap with the side walls of the other housing part. In such a design of the connecting flanges, a connection of the same can be formed which utilizes the advantages of providing the supporting projections described above.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure is further described below on the basis of embodiments with reference to the accompanying figures, wherein.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

A battery housing 1 comprises a frame 2. The frame 2 itself is made up of a plurality of hollow chamber profiles 3, each being connected to the others by corner pieces 4. The hollow chamber profiles 3 are extruded aluminum profiles. A first housing part (not visible in FIG. 1) in the manner of a pan is inserted into the frame 2. This pan-type housing part is closed at the top by a second housing part 5 designed as a cover. The second housing part 5 which serves as a cover is releasably connected to the first housing part (not shown in FIG. 1) by its frame 2.

Figure 1:
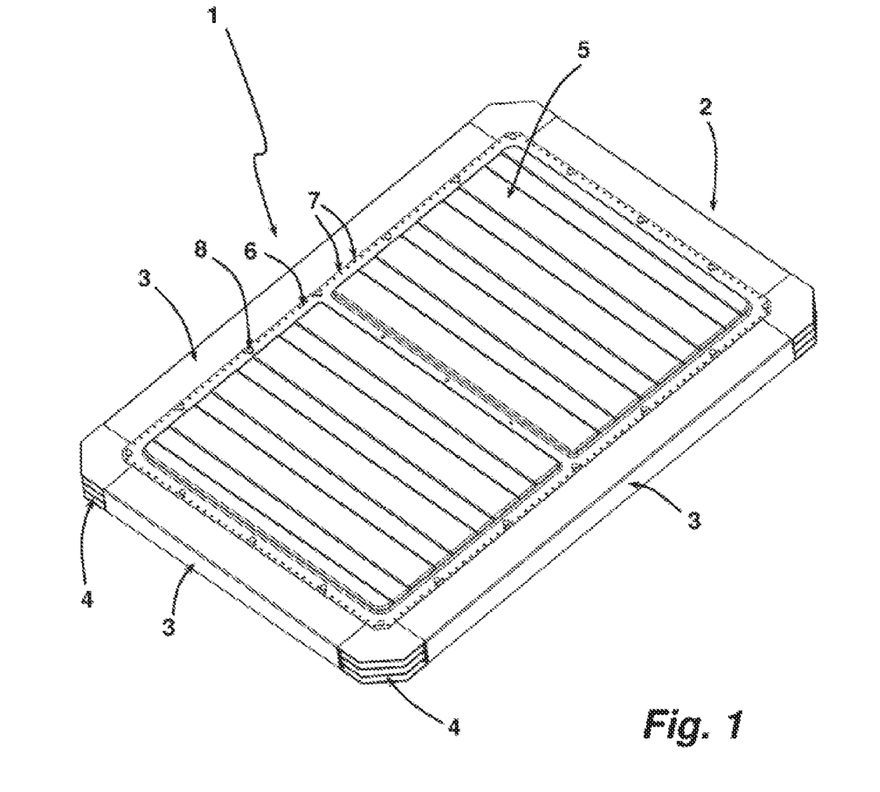
FIG. 1 shows battery housing for a vehicle driven by electric motor in a perspective diagram according to a first embodiment of the fastening of a cover part as the first housing part onto another housing part.

The second housing part 5 has a circumferential connecting flange 6 protruding outward in the radial direction. Supporting projections 7 extending in the direction of the other housing part and/or the frame 2 are formed in the connecting flange. These projections extend from the bottom side of the connecting flange 6. The supporting projections 7 in the embodiment shown here have a round cross-sectional area. With their peak they act against the connecting flange of the first housing part, to which the housing part 5 is connected. The supporting projections 7 are arranged at a regular spacing from one another following the outer closure of the connecting flange 6.

Fastening boreholes, into each of which a screw fastener 8 is inserted to connect the second housing part 5 to the first housing part 9, are provided in the connecting flange 6 at a radial distance from the row of supporting projections 7. The first housing part 9 is discernible in FIG. 2, forming the pan for the battery chamber in the battery housing 1. The battery chamber accommodates a plurality of battery modules 10. The type of fastening of the second housing part 5 on the first housing part 9 can be seen in the enlarged detail diagram in FIG. 3. This shows the region bordered with broken lines in FIG. 2 enlarged here. The first housing part 9, like the second housing part 5, has a connecting flange 11 that protrudes in the radial direction. A supporting projection 7 can be discerned as part of the second housing part 5 in a side view. A bead-type shape of the supporting projection 7 is clear in this view. The supporting projection 7 acts against the surface of the connecting flange 11 facing toward the connecting flange 6 with its peak. FIG. 3 shows the arrangement of screw fasteners 8 with their screw shafts 12 spaced a distance away from the peak of the supporting projection 7. Between the two connecting flanges 6, 11, there is a circumferential gasket 13 between the two connecting flanges 6, 11 on the side of the screw fastener 8 facing away from the supporting projection 7. The section of the connecting flange 6 adjacent to the supporting projection 7 acts as a tension leg when the screw fastener 8 is secured. Due to the supporting projection 7, there is a concentration of tension force on the peak of the supporting projection 7, acting on the connecting flange 6 via the screw fastener 8. Because of the concentration of force achieved in this way, support of the two connecting flanges 6, 11 is designed with a special contact pressure. This meets the EMC requirements of an electrical contacting of the two housing parts 5, 9 which are manufactured as steel plate parts. In addition, the sections of the connecting flanges 6, 11 adjacent to the supporting protrusions are spaced a distance apart by the supporting projections 7, so that this is moved in the direction of the connecting flange 11 according to the gap width between the tension leg of the connecting flange 6 and the connecting flange 11 in applying tension through the screw fasteners 8. In this way, the gasket 13 situated between the connecting flanges 6, 11 can be prestressed in a particularly effective manner.

Figure 2:
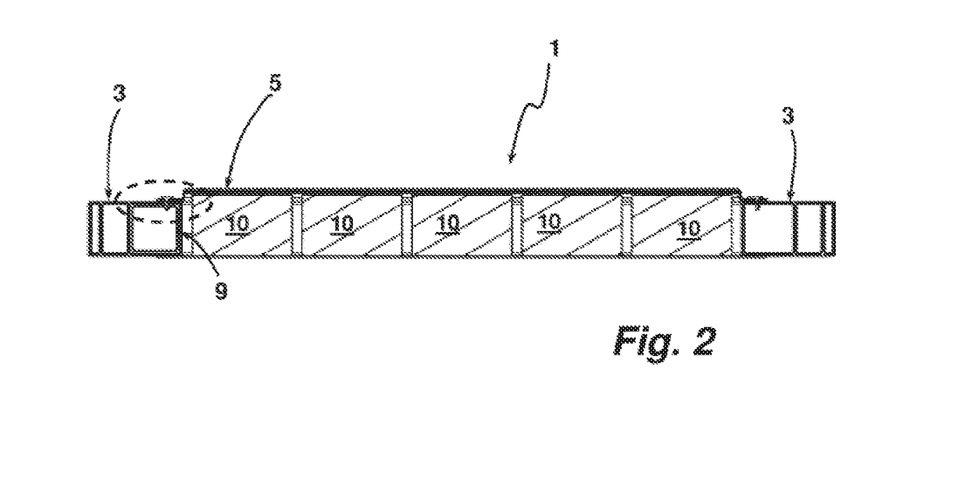
FIG. 2 shows a cross section through the battery housing of FIG. 1.
Figure 3:
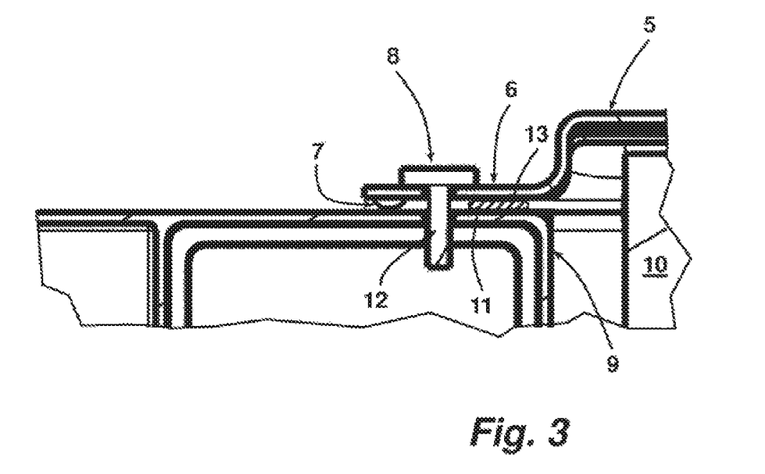
FIG. 3 shows an enlarged detail from the diagram of the battery housing in FIG. 2.
Figure 4:
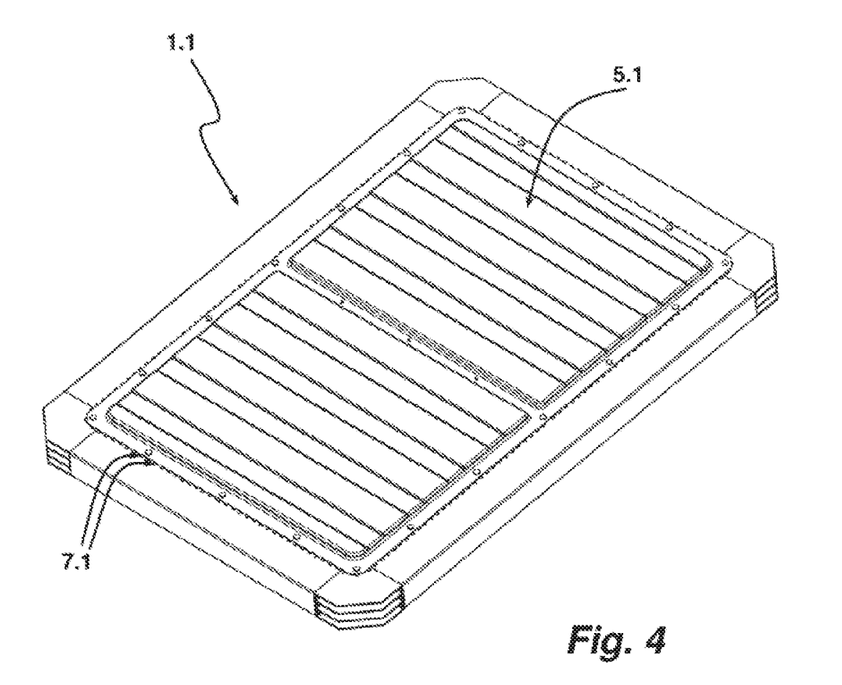
FIG. 4 shows a battery housing for a vehicle driven by electric motor in a perspective diagram according to another embodiment of the fastening of a cover part as the first housing part onto another housing part.

FIG. 4 shows a second battery box 1.1 which is designed in principle in the same way as the battery box 1 in FIGS. 1 through 3. Therefore, only the differences are described below. The battery box 1.1 differs from the battery box 1 in the design of its supporting projections 7.1. The supporting projections 7.1 are extensions of the connecting flange 6.1 at its outer closure, as can be seen better from the partial cross-sectional diagram in FIG. 5, these extensions being bent at an angle out of the plane of the connecting flange 6.1 in the direction of the connecting flange 11 of the first housing part 9. The function of these angle bent supporting projections 7.1 corresponds to what was done in the preceding embodiment regarding the supporting projections 7. Supporting projections 7.1 of this type are preferably used when the top side of the connecting flange 11 of the first housing part 9 has an electrically non-conducting coating, for example, an enamel coating. Due to the angle bend with respect to the plane of the connecting flange 6.1, the typical sharp edge design of the supporting projections 7.1 is impressed into the coating when tightening the screw fastener 8, so that a secure contacting of the steel plate beneath the coating is ensured.

Figure 5:
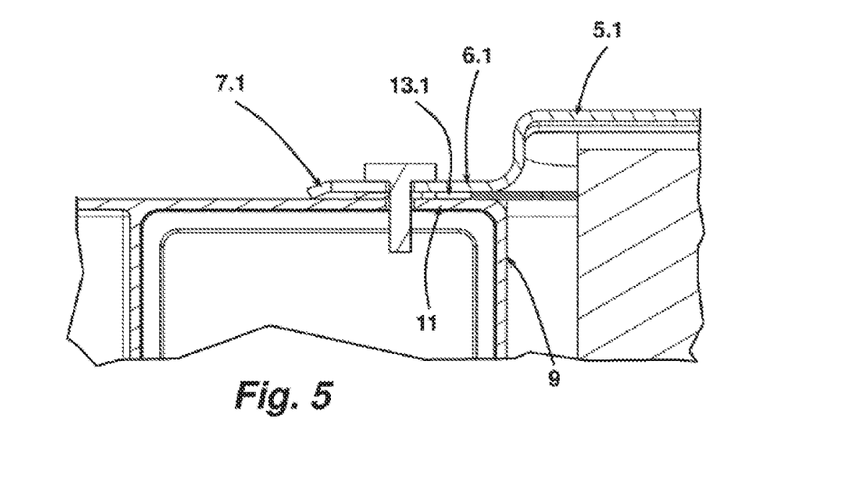
FIG. 5 shows an enlarged partial cross-sectional diagram of the battery housing from FIG. 4 in a detail according to that in FIG. 3 with respect to the cross section of FIG. 2.

The embodiment of the mechanical connection between the second housing part 5.1 designed as a cover part and the first housing part 9 can be seen from the partial sectional diagram in FIG. 5. This is also apparent for the support of the angle bent supporting projections 7.1.

A circumferential gasket 13.1 is inserted between the two connecting flanges 6.1, 11.

Figure 6:
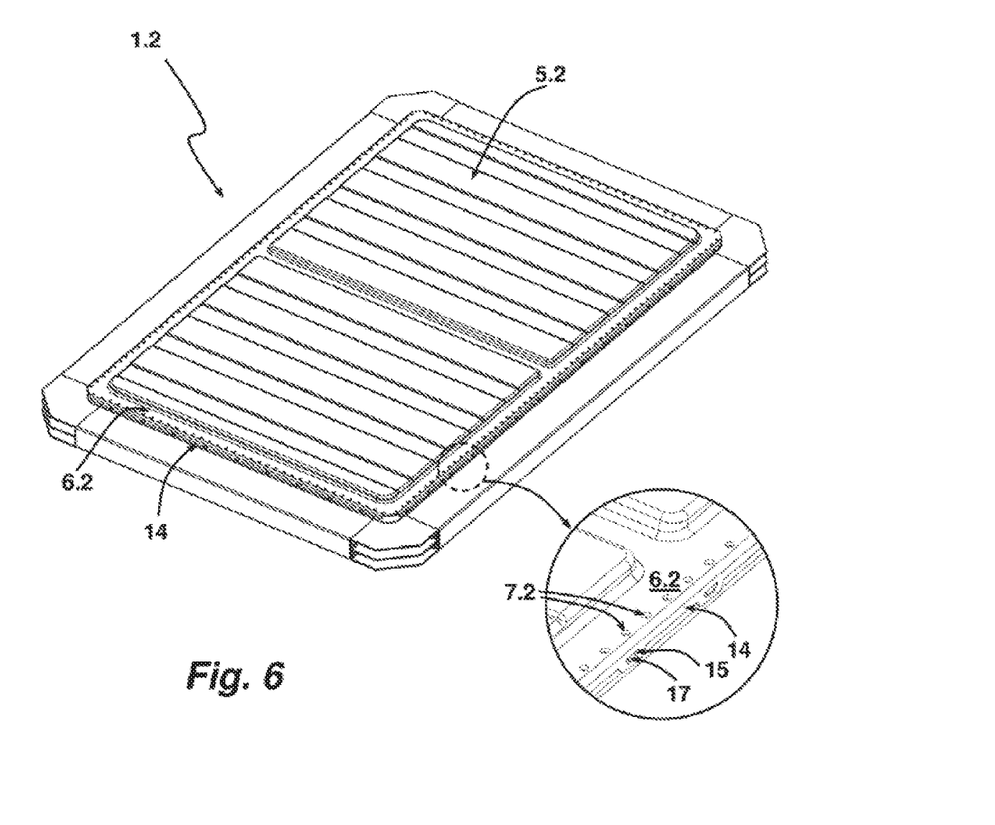
FIG. 6 shows a battery housing for a vehicle driven by electric motor in a perspective diagram according to yet another embodiment of the fastening of a cover part as the first housing part onto another housing part.
Figure 7:
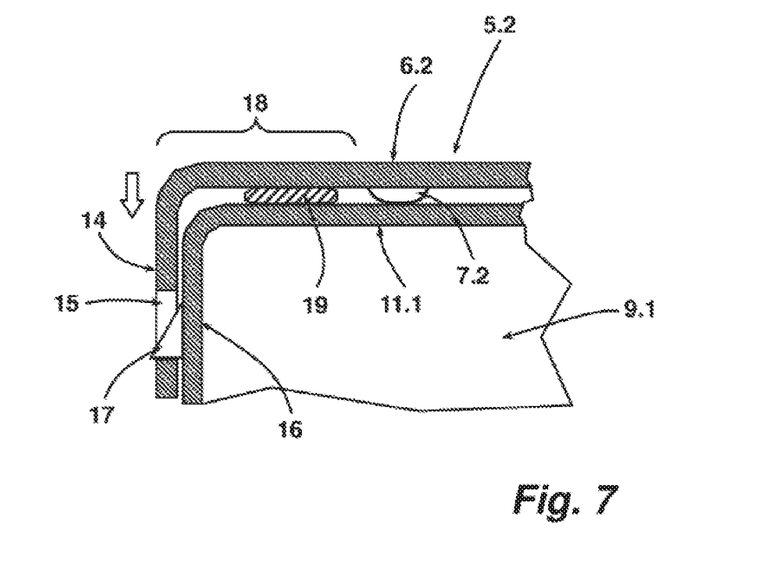
FIG. 7 shows a schematic partial cross-sectional diagram of the battery housing from FIG. 6 to illustrate the mechanical connection of the two housing parts.

FIG. 6 shows yet another battery box 1.2 which is also constructed in principle like the battery box 1 in FIGS. 1 to 3, but differs from them in the type of connection of the second housing part 5.2 which serves as the cover onto the first housing part 9.1. In the embodiments of the battery housing 1, 1.1, screw fasteners are used to establish the mechanical connection between the two steel plate housing parts, whereas the housing parts 5.2, 9.1 of the battery housing 1.2 are joined together by a clip lock. To this end, the connecting flange 6.2 of the second housing part 5, which serves as the cover, has a leg 14 bent at an angle in the direction of the other housing part 9.1 (see FIG. 7) on its outer closure. This leg 14 has a recess 15 as the first part of a clip lock. The connecting flange 11.1 of the pan-type first housing part 9.1 also has a leg 16, which is bent at an angle in the same direction and, as a clip lock member, has a bar cam 17 extending outward in the radial direction and therefore in the direction of the leg 14. It has an asymmetrical design and is designed for engaging in the recess 15. FIG. 7 shows the locked position of the two connecting flanges 6.2, 11.1. The spring elasticity required for the clip connection results from a tension leg 18, which is present on the outside with respect to the battery chamber in this embodiment, as the outer section of the connecting flange 6.2 with respect to its supporting projections 7.2. The clip lock members 15, 17 are coordinated with one another so that in the mounted position of the second housing part 5.2 and the first housing part 9.1, the tension leg 18 is put under prestress due to the support of the connecting flange 6.2 over its supporting projection 7.2 on the connecting flange 11.1, as indicated by a block arrow in FIG. 7. If the connecting flanges 6.2, 11.1 are elastically deformable in the same way in the tension direction, then the section of the connecting flange 11.1 adjacent to the contact of the supporting projection 7.2 in the direction of its bent leg 16 may also be involved in producing the prestress. The prestress is induced by the restoring force of the sections of the connecting flanges 6.2, 11.1, which is due to the material as described above. This ensures not only secure locking of the clip lock, but also an equal contact pressure between the peaks of the supporting projections 7.2 and the top side of the connecting flange 11.1, the pressure being constant over the circumference of the second housing part 5.2, regardless of the tension moment of a screw fastener.

For sealing the battery chamber, there is a peripheral gasket 19 between the tension leg 18 and the connecting flange 11.1 and adjacent to the supporting projections 7.2, so the gasket is also put under pressure when the clip lock is in the locked position, as shown in FIG. 7. Since the gasket 19 is elastic, the restoring force of the gasket 19 also reinforces the locking of the clip lock.

Figure 8:
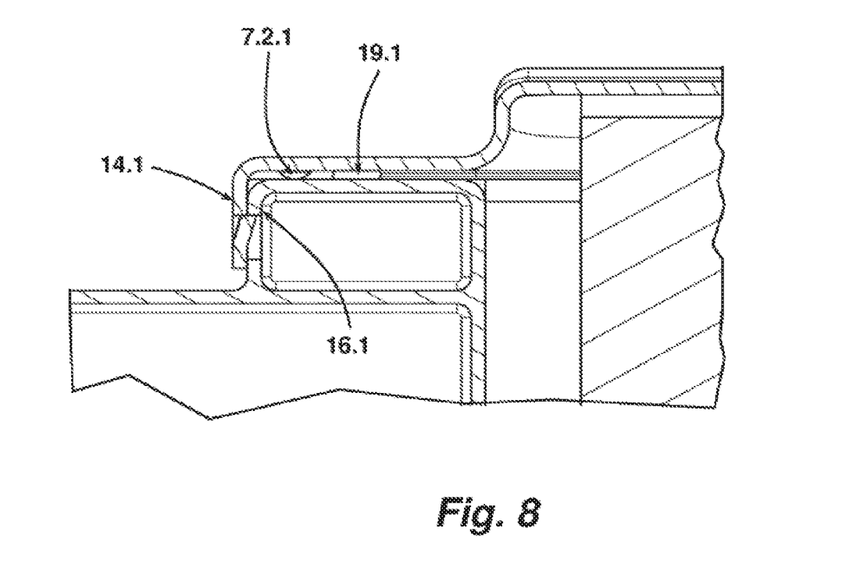
FIG. 8 shows a detail of a battery box whose housing parts are interconnected by a clip lock, according to another embodiment.

FIG. 8 shows the connection of two housing parts of a battery box according to another embodiment. The two housing parts are also joined together by a clip lock such that, in the embodiment in FIG. 8, the outer bent leg 14.1 has a bar strap and the bent leg 16.1 has the recess for the extended bar strap. In this embodiment, the gasket 19.1 is on the inside with respect to the supporting projection 7.2.1.

Figure 9:
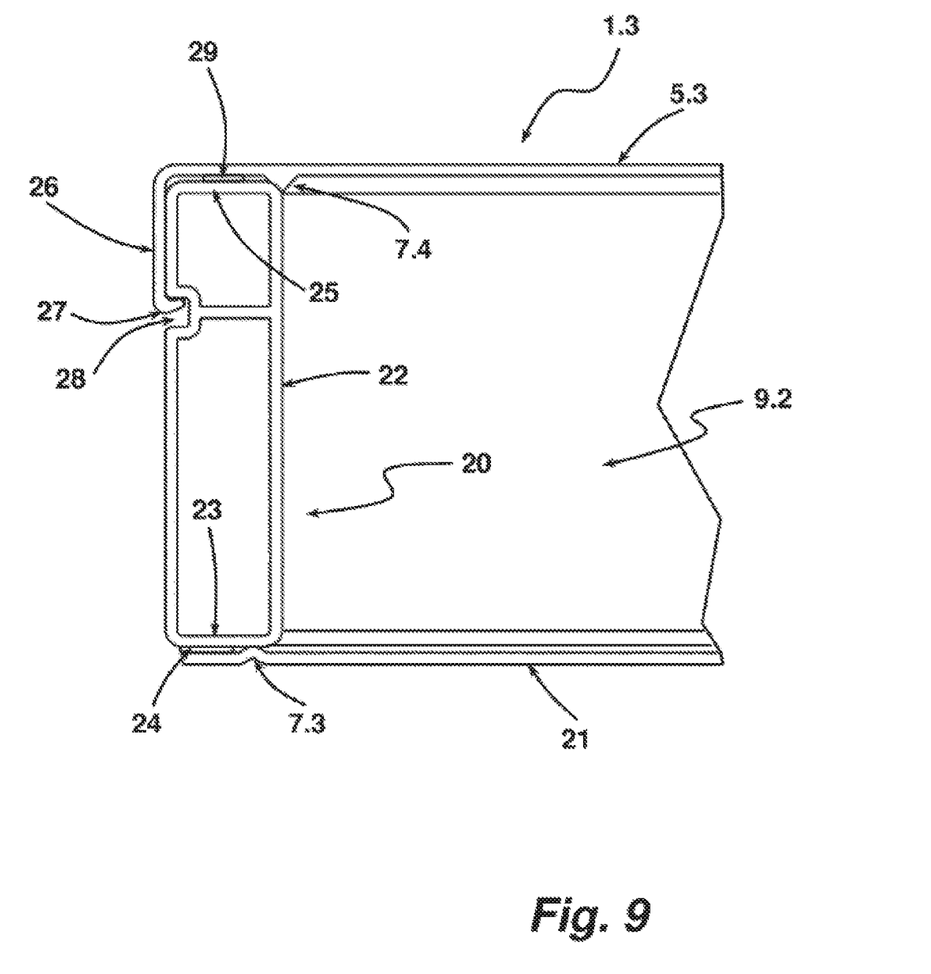
FIG. 9 shows a partial cross-sectional diagram of a detail of a battery housing according to another embodiment.

In a partial transverse sectional view, FIG. 9 shows another battery housing 1.3 whose second housing part 5.3, designed as a cover part, is also connected to the first housing part 9.2 by clip locks. In this battery housing, the first housing part 9.2, designed as a pan, is provided by a circumferential frame 20 and a bottom plate 21 connected thereto by an adhesive bond. The frame 20 is in turn formed by hollow chamber profiles 22 that are joined together. A circumferential supporting projection 7.3 is embossed in the bottom side of the bottom plate 21. The supporting projection 7.3 is provided to contact the lower narrow side 23 of the hollow chamber profile 20. The border section of the bottom plate 21 carrying the supporting projection 7.3 forms its connecting flange. On the outside with respect to the circumferential supporting projection 7.3, this connecting flange is connected to the narrow side 23 of the hollow profile 22 by an adhesive bond 24, with the narrow side 23 of the profile 20 also serving as a connecting flange.

The second housing part 5.3 of the embodiment shown in FIG. 9 is a die-cast part. The outer circumferential edge section of this second housing part 5.3 has a supporting projection 7.4 forming a sharp rib on its side facing in the direction of the frame 20 and/or the hollow chamber profiles 22. The upper narrow side 25 of the hollow chamber profiles 22 represents the connecting flange that cooperates with the second housing part 5.3. The second housing part 5.3, like the embodiment already described above with respect to the clip lock, also has a leg 26 bent in the direction of the first housing part 9.1. On its free end, this leg 26 has a bent hook 27. The hollow chamber profile 22 has a circumferential recess channel 28 as a complementary clip lock member on its outside, such that the hook 27 of the second housing part 5.3 engages in this clip lock member formed by the channel 28. Although the adhesive bead 24 is also responsible for the desired seal in the connection of the bottom plate 21 to the frame 20, a circumferential gasket 29 which is prestressed by the tension force of the clip lock is inserted between the connecting flanges of the first and second housing parts 9.2, 5.3.

One particular advantage of using such fastening means is that no additional elements must be handled in assembly and dismantling. Furthermore, this reduces costs. At least assembly of the two housing parts to one another is fundamentally possible without the use of tools.

In an embodiment not shown in the figures, the bent leg of the housing part on the outside has a hook leg which protrudes inward at the bottom and engages behind the lower closure of the other bent leg to create the clip lock. Likewise, in another embodiment, the bent leg of the housing part on the inside has a recessed channel in which a hook-shaped element bent inward on the other connecting flange engages to produce the clip lock.

While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS 1, 1.1, 1.2, 1.3 Battery housing
2 Frame

3 Hollow chamber profile
4 Corner piece
5, 5.1, 5.2, 5.3 Second housing part
6, 6.1, 6.2 Connecting flange
7, 7.1, 7.2, 7.2.1, 7.3, 7.4 Supporting projection
8 Screw fastener
9, 9.1, 9.2 First housing part
10 Battery module
11, 11.1 Connecting flange
12 Shaft
13, 13.1 Gasket
14, 14.1 Leg
15 Recess
16, 16.1 Leg
17 Bar cam
18 Tension leg
19, 19.1 Gasket
20 Frame
21 Bottom plate
22 Hollow chamber profile
23 Narrow side
27 Hook
28 Recess channel
29 Gasket

The invention claimed is:

1. A battery housing for a vehicle driven by electric motor, comprising:
 a first housing part and a second housing part which is electrically connected to the first housing part, said housing parts enclose a battery chamber for receiving one or more battery modules;
 each of the housing parts has a connecting flange, wherein the connecting flange of at least one of the housing parts has a plurality of supporting projections spaced a distance apart from one another in the circumferential direction of the connecting flanges, each of the supporting projections extending in the direction of the connecting flange of the other housing part providing an abutting support for the connecting flange of the other housing part;
 the connecting flanges of the housing parts are put under pretension with one another by fastening means arranged at a distance from the supporting projections, whereby the first and second housing parts are electrically connected via the supporting projections; and
 wherein the fastening means comprises clip locks, and each connecting flange has at least one first member of a clip lock cooperating with a second member of the clip lock on the other connecting flange.

2. The battery housing of claim 1, wherein each supporting projection is a sickle-shaped embossing.

3. The battery housing of claim 1, wherein the plurality of supporting projections are arranged in a row.

4. The battery housing of claim 3, wherein each of the supporting projections have a point-shaped peak which contacts the connecting flange of the other housing part.

5. The battery housing of claim 1, wherein the connecting flange of only one of the housing parts has the supporting projections.

6. The battery housing of claim 1, wherein the connecting flange of the second housing part has a leg which is bent in the direction of the connecting flange of the first housing part, the leg extends along the connecting flange of the first housing part, and the leg has at least one clip lock member of a clip lock in the area of its free end.

7. The battery housing of claim 6, wherein the at least one clip lock member is a hook which engages behind the connecting flange of the first housing part.

8. The battery housing of claim 7, wherein the connecting flange of the first housing part has a leg which is bent at an angle in the same direction as the leg of the connecting flange of the second housing part, and the hook of the connecting flange of the second housing part engages behind a lower closure of the leg of the first housing part.

9. The battery housing of claim 6, wherein the connecting flanges of the housing parts each have a leg bent at an angle in the same direction, and one of the two legs has a recess as a clip lock member of the clip lock and the other leg has a bar cam as a clip lock member of the clip lock which engages into the recess.

10. The battery housing of claim 1, wherein the connecting flange of the second housing part is part of a frame of the battery housing.

11. The battery housing of claim 1, wherein the housing parts are steel workpieces.

12. The battery housing of claim 11, wherein one of the housing parts is connected to a battery housing frame.

13. The battery housing of claim 12, wherein the battery housing frame is assembled from light metal hollow chamber profiles.

14. The battery housing of claim 12, wherein the housing part connected to the battery housing frame is connected to the battery housing frame and to the other housing part using clip locks.

* * * * *